(12) United States Patent
Chwa (10) Patent No.: US 7,068,298 B2
(45) Date of Patent: Jun. 27, 2006

(54) PORTABLE TERMINAL HAVING A CAMERA AND METHOD FOR TAKING A PHOTOGRAPH WITH THE SAME

(75) Inventor: Gyung-Yun Chwa, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 71 days.

(21) Appl. No.: 10/803,688

(22) Filed: Mar. 18, 2004

(65) Prior Publication Data

US 2004/0192400 A1 Sep. 30, 2004

(30) Foreign Application Priority Data

Mar. 31, 2003 (KR) ............... 10-2003-0020256

(51) Int. Cl.
*H04N 7/14* (2006.01)

(52) U.S. Cl. ................ 348/14.01; 455/569.1

(58) Field of Classification Search .......... 348/14.01, 348/14.02, 14.05, 14.06, 14.08; 455/566.1, 455/343.2, 569.1, 569.2, 550.1
See application file for complete search history.

(56) References Cited

U.S. PATENT DOCUMENTS

| 5,138,459 A | 8/1992 | Roberts et al. |
| 6,233,002 B1 | 5/2001 | Shibayama |
| 6,459,911 B1 | 10/2002 | Hijii |

FOREIGN PATENT DOCUMENTS

| CN | 1215970 | 5/1999 |
| EP | 1 229 720 | 8/2002 |
| WO | WO 00/65803 | 11/2000 |

*Primary Examiner*—Wing Chan
(74) *Attorney, Agent, or Firm*—Dilworth & Barrese LLP (57) ABSTRACT

A portable terminal having a camera. The portable terminal comprises a jack interface connected to an external device, the external device being capable of selecting a command for controlling at least one operation which is set in either a common mode or a camera mode during an operation; a control module for setting an operation mode to any one of the common and camera modes according to an inputted signal and for causing an image scanned through the camera to be photographed when the command is inputted from the external device during an operation in the camera mode; and a storing module for storing the image photographed under the control of the control module.

13 Claims, 9 Drawing Sheets

PORTABLE TERMINAL HAVING A CAMERA AND METHOD FOR TAKING A PHOTOGRAPH WITH THE SAME

PRIORITY

This application claims priority to an application entitled "Portable Terminal Having A Camera And Taking A Photograph Method Using That" filed in the Korean Industrial Property Office on Mar. 31, 2003 and assigned Serial No. 2003-20256, the contents of which are hereby incorporated by reference.

BACKGROUND OF THE INVENTION

1. Field of the Invention

The present invention relates to a portable terminal having a camera and method for taking a photograph with the same, and more particularly to a portable terminal having a mobile communication function and a camera capable of photographing a scanned image displayed on a display screen, and a method for taking a photograph with the portable terminal.

2. Description of the Related Art

In general, a "portable terminal" refers to portable equipment which can provide a user with various wireless communication services during wireless communication with a base station. This portable terminal is becoming more common among men and women, young and old, everywhere in the world, and is thus gradually gaining the status of a necessity. The portable terminal is provided with, for example, a transmitting/receiving unit, a data input/output unit, and an antenna module in order to transmit and receive voice or image data signals to and from a counterpart.

Figure 1:
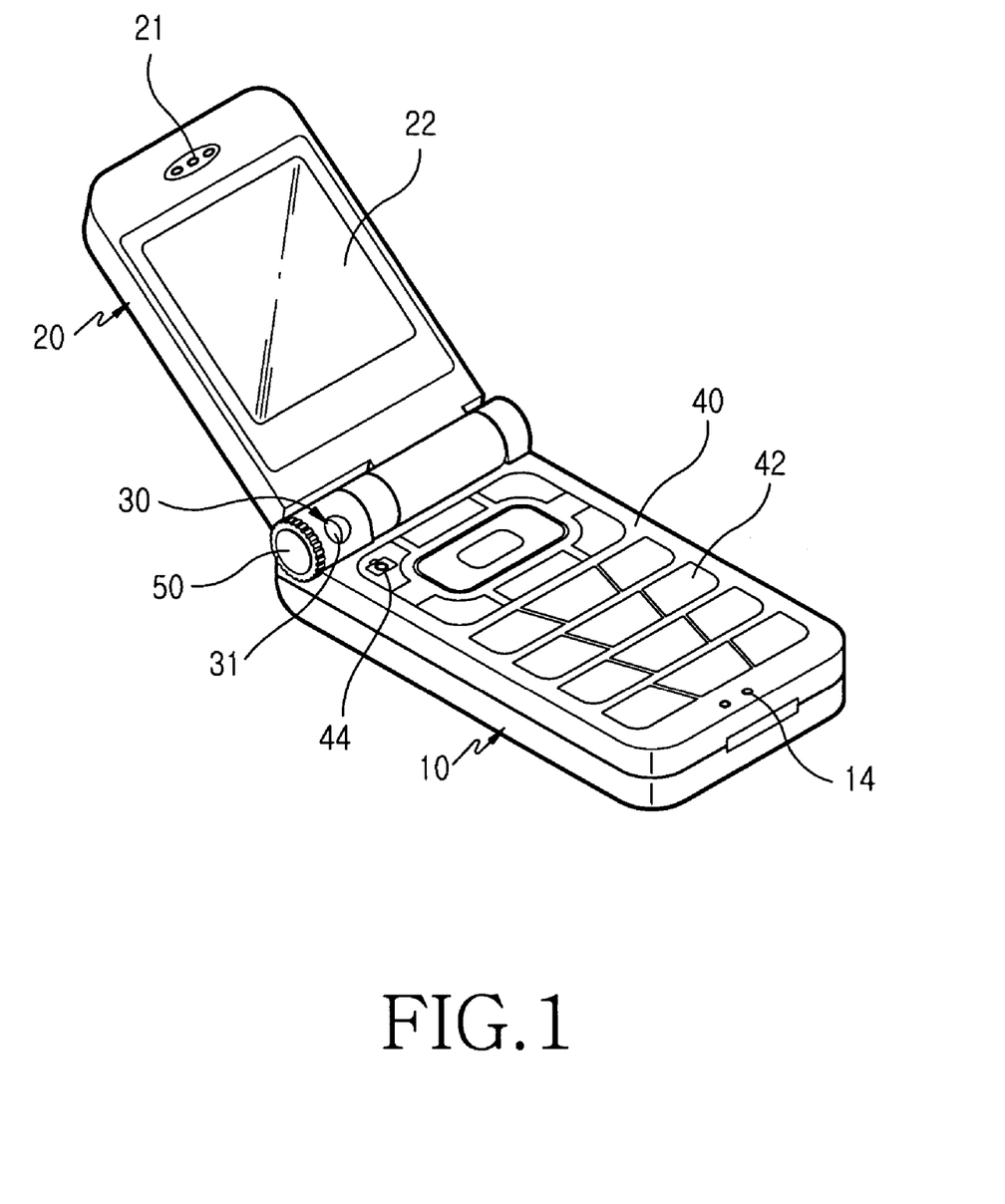
FIG. 1 shows one example of a folder-type terminal from among the typical portable terminals.

FIG. 1 shows one example of a folder-type terminal from among the typical portable terminals. This folder-type terminal has two housings which are pivotably connected to each other by a hinge module. Hereinafter, these two housings will be referred to as a main housing and a folder. That is, the known folder-type terminal includes a main housing 10, a folder 20 and a hinge module 30, in which the hinge module 50 provides a rotatable connection and at the same time an opening and closing force between the main housing 10 and the folder 20, in a direction of one rotating nearer to or farther from the other.

As shown in FIG. 1, the known folder-type terminal includes a main housing 10, a folder 20, a hinge module 50 connecting the folder 20 to the main housing 10 in a pivotable manner, and a lens system 30 mounted to the hinge module 50 rotatably.

The main housing 10 has an upper surface 40 provided with a key pad 42 and a microphone device 14, in which the key pad has a plurality of keys arrayed.

The folder 20 includes a speaker device 21 and a display device such as an LCD (Liquid Crystal Display) 22. Further, the lens system 30 includes, for example, a lens 31 and a built-in CCD (Charge-Coupled Device) which is known and not shown. Here, the lens system 30 has a housing arranged rotatably in a direction equal to an axle of the hinge module 50 connecting the main housing 10 with the folder 20, so that the lens housing can rotate about the axle of the hinge module 50.

Meanwhile, the upper surface 40 of the main housing 10 is provided with a camera key 44, by which a camera function can be selected from the lens system 30 and an image scanned through the lens 31 can be photographed. Therefore, to make use of the camera function of the portable terminal, a user selects the camera key 44 in a situation in which the user looks at the condition in which a subject is scanned through the lens 31 and then determines to take a photograph of the subject.

However, there is a problem in that upon selecting the camera key 44 in such a situation, an image scanned through the lens 31 shakes as a result of the force of pressing the camera key 44. As a result of this, it is difficult to get a photographed image having a high resolution.

In addition, the upper surface 40 of the main housing 10 of the portable terminal further comprises a plurality of function and call keys which are provided for an operation of the portable terminal, and a plurality of numeral keys which are provided for input of various numerals and characters. Therefore, when a user selects the camera key 44 to take a photograph of a scanned image with his/her own finger (generally, a thumb), the user should pay attention to avoid pressing other peripheral keys which are provided on the main housing 10 of the portable terminal. Further, when one or more scanned image is continuously photographed within a photographable time, the lens 31 is shaken more. Consequently, it becomes even more difficult to obtain a photographed image having a clear image quality.

SUMMARY OF THE INVENTION

Accordingly, the present invention has been made to solve the above-mentioned problems occurring in the prior art, and an object of the present invention is to provide a portable terminal having a camera and method for taking a photograph with the same, capable of compensating for shaking of the camera resulting from selection of a camera key arranged on the body of the portable terminal when a user wants to photograph a scanned image using the portable terminal having the camera.

It is another object of the present invention to provide a portable terminal having a camera and method for taking a photograph with the same, capable of compensating for deterioration of image quality caused by shaking of the camera generated when a user wants to photograph a scanned image using the portable terminal having the camera, in particular caused by selecting a camera key arranged on the body of the portable terminal.

In order to accomplish these objects, there is provided a portable terminal having a camera, comprising: a jack interface connected to an external device, the external device being capable of selecting a command for controlling at least one operation which is set in either a common mode or a camera mode; a control module for setting an operation mode to either the common mode or the camera mode according to an inputted signal and for causing an image scanned through the camera to be photographed when the command is inputted from the external device during an operation in the camera mode; and a storing module for storing the image photographed under the control of the control module.

Herein, the camera mode is a mode for photographing the image scanned through the camera, and the common mode is an operation standby mode which excludes the camera mode. In the embodiment of the present invention, the external device is an ear handset.

The ear set comprises: a handset module including a call key for selecting a call command in the common mode and a photographing command in the camera mode, a microphone for transmitting sounds to a counterpart, and an ear speaker outputting voice signals outputted from the jack interface.

The ear set may alternatively include: a handset module including a call key for generating a signal having a predetermined level corresponding to a call command according to a signal inputted in the common mode, a shutter key for generating a signal having a predetermined level different from the signal of the call key in correspondence to a photographing command according to a signal inputted in the camera mode, and a microphone for transmitting sounds to a counterpart; and an ear speaker outputting voice signals outputted from the jack interface. Thus, the control module causes dialing for a call to be performed when a level signal corresponding to selection of the call key is inputted, causing the image scanned on the camera to be photographed when a level signal corresponding to selection of the shutter key is inputted.

The ear set may also alternatively include: a handset module including a call key for selecting a call command in the common mode, a shutter key for selecting a photographing command in the camera mode, a microphone for transmitting sounds to a counterpart, and an ear speaker outputting voice signals outputted from the jack interface. Herein, there is a plurality of jack interfaces so as to input the selection signals of the call and shutter keys. Thus, the control module causes dialing for a call to be performed when a selection signal of the call key is inputted into a first jack interface for inputting the selection signal of the call key, and causes the image scanned on the camera to be photographed when a selection signal of the shutter key is inputted into a second jack interface for inputting the selection signal of the shutter key.

In another embodiment, in order to accomplish these objects, there is provided a portable terminal having a camera, comprising: a wireless communication interface for performing intercommunication with a wireless remote controller, the wireless remote controller being capable of selecting a photographing command in a camera mode; a control module for setting an operation mode to either a common mode or the camera mode according to an inputted signal and for causing an image scanned through the camera to be photographed when the photographing command is inputted from the wireless remote controller during an operation in the camera mode; and a storing module for storing the image photographed under the control of the control module.

The remote controller comprises: a wireless communication module for performing intercommunication with the wireless communication interface; and a button for selecting the photographing command.

In a further embodiment, in order to accomplish these objects, there is provided a portable terminal having a camera, comprising: a connector interface for performing intercommunication with a wire remote controller, the wire remote controller being capable of selecting a photographing command in a camera mode; a control module for setting an operation mode to either a common mode or the camera mode according to an inputted signal and for causing an image scanned through the camera to be photographed when the photographing command is inputted from the wire remote controller during an operation in the camera mode; and a storing module for storing the image photographed under the control of the control module.

In yet another embodiment, in order to accomplish these objects, there is provided a method for taking a photograph using a portable terminal with a camera, comprising the steps of: a) setting an operation mode to either the common mode or the camera mode according to an inputted signal; b) when a call command is inputted outside, determining the set operation mode; and c) if it is determined that the set operation mode is the camera mode, photographing an image scanned through the camera corresponding to the inputted call command.

Preferably, the method for taking a photograph using a portable terminal further comprising the step of: if it is determined that the operation mode set in step b) is the common mode, performing dialing for a call corresponding to the inputted call command.

According to the present invention, when a command for photographing a subject scanned through the camera module is inputted through an external device, such as the handset module which is provided outside the portable terminal and capable of performing intercommunication with the portable terminal, the scanned subject is photographed by the photographing command inputted. Thus, while the scanned subject is photographed, the camera module can be prevented from being shaken, and thereby an image having better image quality can be obtained. Further, the call and camera keys with which the external ear set is separately provided are each set to output a signal having a different level. The control module causes the call mode and the camera mode to be alternatively performed according to the level of the inputted signal. As a result, an image scanned in the camera mode can be photographed without shaking.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described below in detail with reference to the accompanying drawings. It should be noted that similar parts are given reference numerals and symbols as similar as possible throughout the drawings. In the following description, numerous specific details are set forth, such as components of a specific circuit, to provide a thorough understanding of the present invention. However, it will be obvious to those skilled in the art that the present invention may be practiced without such specific details. In the description of the present invention, a detailed description of known functions and configurations incorporated herein will be omitted when it may make the subject matter of the present invention unclear.

Figure 2:
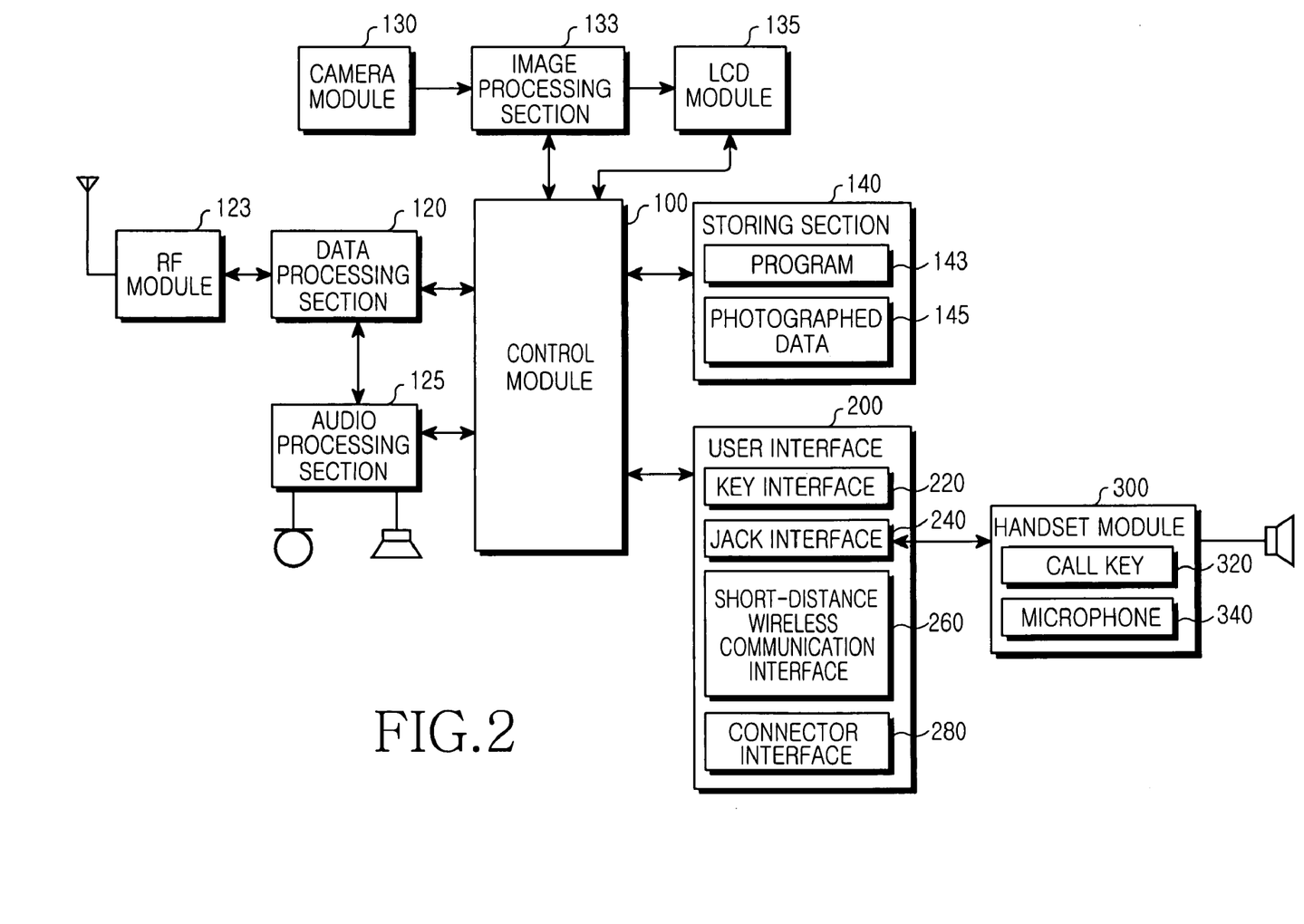
FIG. 2 is a block diagram illustrating a preferred embodiment of a portable terminal having a capability to compensate for shaking of a camera during taking a photograph according to the present invention.

FIG. 2 is a block diagram illustrating a preferred embodiment of a portable terminal having a capability to compensate for shaking of a camera during taking a photograph according to the present invention.

The portable terminal has an RF (Radio Frequency) section 123 used to carry out its wireless communication function. The RF section 123 includes, for example, an RF transmitter for performing up-conversion and amplification of frequencies of received signals and an RF receiver for performing low-noise amplification of the received signals and for performing down-conversion of frequencies. A data processing section 120 may include a MODEM for performing encoding and modulation of signals transmitted by the RF section 123, and a CODEC for performing demodulation and decoding of signals received to the RF section 123. Here, the CODEC includes a data CODEC which processes packet data and so on, and an audio CODEC which processes an audio signal of a voice or the like. An audio processing section 125 either regenerates received audio signals outputted from the audio CODEC of the data processing section 120 or transmits transmitting audio signals, which are generated from the microphone, to the audio CODEC of the data processing section 120.

A camera module 130 photographs an image of a subject scanned through a lens. The camera module 130 includes a camera sensor for converting scanned optical signals into electric signals, and a signal processing section for converting analog image signals scanned from the camera sensor into digital data. Here, the camera sensor may make use of a CCD sensor or a CMOS (Complementary Metal Oxide Semiconductor), and the signal processing section may be implemented as a DSP (Digital Signal Processor). Further, the camera sensor and the signal processing section may be integrally or separately implemented.

An image processing section 133 functions to generate display data for displaying image signals outputted from the camera module 130. The image processing section 133 processes image signals, which are outputted from the camera module 130, by the frame, and then adjusts and outputs frame image data to correspond to a size as well as to other properties, such as an acceptable resolution of an LCD module 135. Further, the image processing section 133 includes an image CODEC, and functions to either compress frame image data presented on the LCD module 135 in a preset way or restore the compressed frame image data into original frame image data. Examples of the image CODEC include a JPEG CODEC, an MPEG 4 CODEC, and a Wavelet CODEC. The image processing section 133 has an OSD (On Screen Display) function and is capable of combining and outputting the image data with OSD data under the control of a control module 100.

The LCD module 135 causes both the image data outputted from the image processing section 133 and the user data outputted from the control module 100 to be displayed on its LCD. Here, the LCD module 135 may further comprise, for example, an LCD controller, a memory capable of storing image data, and an LCD panel. Alternatively, the LCD module 135 may be implemented in a touch screen type. In this case, the LCD module may act as an input section.

A storing section 140 is stored with a program 143 and photographed data 145. Here, the program 143 is for controlling a general operation of the portable terminal. Further, the photographed data 145 are images scanned through the camera module 130, and in particular images photographed under the control of the control module 100.

A user interface 200 allows a user to input a desired command and provide an operation corresponding to the inputted command. The user interface 200 includes a key interface 220, a jack interface 240, a short-distance wireless communication interface 260 and a connector interface 280.

The key interface 220 refers to a plurality of keys which are provided on the upper surface 40 of the main housing 10 of the portable terminal shown in FIG. 1. The jack interface 240 is an interface for connecting, for example, an ear set and for inputting commands for call start and end of the portable terminal using a call key 320 installed on the ear handset. The short-distance wireless communication interface 260 supports local area networks, such as infra-red communication and Bluetooth communication, and performs intercommunication with a terminal for an external local area wireless communication. The connector interface 280 is called a UART (Universal Asynchronous Receiver/Transmitter), and is connected with an external device so that corresponding data can be received and transmitted and is connected with a charger with a power receptacle so that power can be supplied.

The user interface 200 performs the foregoing functions according to its application, and serves two functions according to the present invention, one of which receives a photographing command for photographing an image scanned through the camera module 130, and the other provides the received command to the control module 100. Thus, when the control module 100 receives the photographing command, just then an image is scanned through the camera module 130. The scanned image is received by the image processing section 133 as image signals. These image signals are detected by the control module 100 as photographed data. The control module 100 puts the photographed image data to be represented on the LCD module 135, and puts information requesting whether or not the photographed image data are to be stored to be represented on the LCD module 135. When a command requesting to store the photographed image data is inputted, the control module 100 stores the photographed image data onto the storing section 140.

According to FIG. 2, the jack interface 240 is connected to the ear handset. The ear set includes a handset module 300 which is connected with the jack interface 240 and carries out transmitting and receiving of data, and a speaker which is connected to the handset module 300 and outputs voice signals transmitted from the jack interface 240. The handset module 300 has a call key 320 and a microphone 340. The call key 320 is a key for calling when the portable terminal is in the state in which calling and wireless communication are not performed. The microphone 340 is for transmitting sounds to a counterpart during communicating.

In this embodiment, in the case of a camera mode, as an operation mode of the portable terminal, in which an image scanned through the camera module 130 can be photographed by selection of the camera key (reference numeral 44 of FIG. 1) provided on the key interface 220, when a selection signal of the call key 320 provided on the handset module 300 is inputted through the jack interface 240, the control module 100 detects image signals inputted into the image processing section 133 as photographed data. The control module 100 causes the photographed data to be stored in the storing section 140 upon selection of any one of the keys provided on the key interface 220.

Therefore, when a command for photographing a subject scanned through the camera module 130 is inputted through an external device, such as the handset module 300 which is provided outside the portable terminal and which is capable of performing intercommunication with the portable terminal, the scanned subject is photographed by the inputted photographing command. Thus, the camera module 130 is prevented from being shaken while the scanned subject is photographed, and thus an image having better image quality can be obtained.

Figure 3:
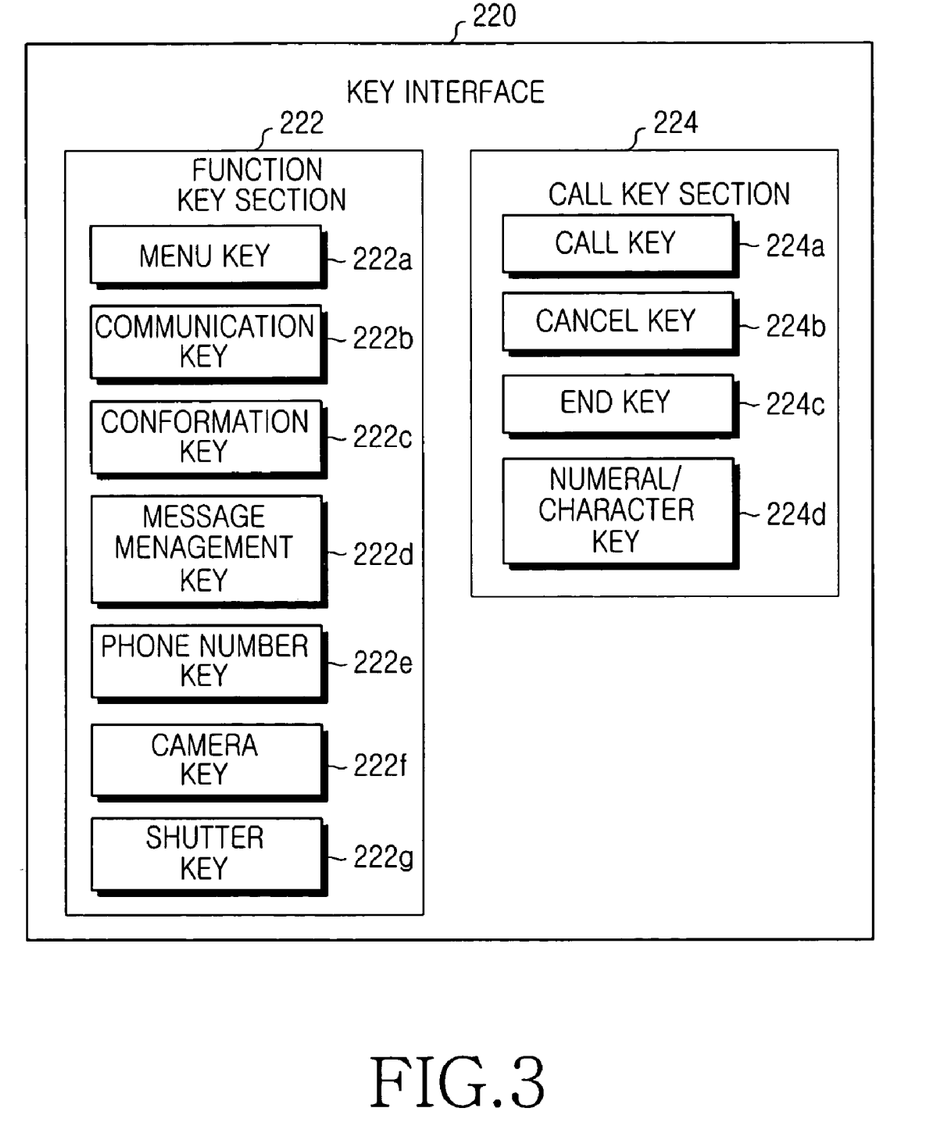
FIG. 3 shows the key interface of FIG. 2 in detail.

FIG. 3 shows the key interface 220 of FIG. 2 in detail. The key interface 220 includes a function key section 222 and a call key section 224. The function key section 222 includes a menu key 222*a* for providing an initial screen selecting a menu of functions which are set to the portable terminal, a communication key 222*b* for wireless communication, a conformation key 222*c* for selecting at least one function represented on the LCD module 135 and for storing at least one function changed, and a management key 222*d* for transmitting and managing character and voice messages. Further, the function key section 222 also includes a phone number key 222*e*, a camera key 222*f* and a shutter key 222*g*. The phone number key 222*e* is for managing at least one phone number. The camera key 222*f* is for entering a camera mode for photographing a subject scanned through the camera module 130. The shutter key 222*g* is for photographing the subject scanned through the camera module 130. Alternatively, the camera key 222*f* and the shutter key 222*g* may be combined into one key. For example, when the shutter key 222*g* is integrated into the camera key 222*f*, the control module 100 is adapted to enter the camera mode when the camera key 222*f* is selected in a common mode, and to photograph the subject scanned through the camera module 130 when the camera key 222*e* is selected once more in the camera mode.

The call key section 224 includes a call key 224*a*, a cancel key 224*b*, an end key 224*c* and numeral/character keys 224*d*. The call key 224*a* is for calling with the phone number represented on the LCD module 135. The cancel key 224*b* is for canceling a particular operation. The end key 224*d* is for terminating a proceeding operation. The numeral/character keys 224*d* are for inputting various numerals and characters.

Figure 4:
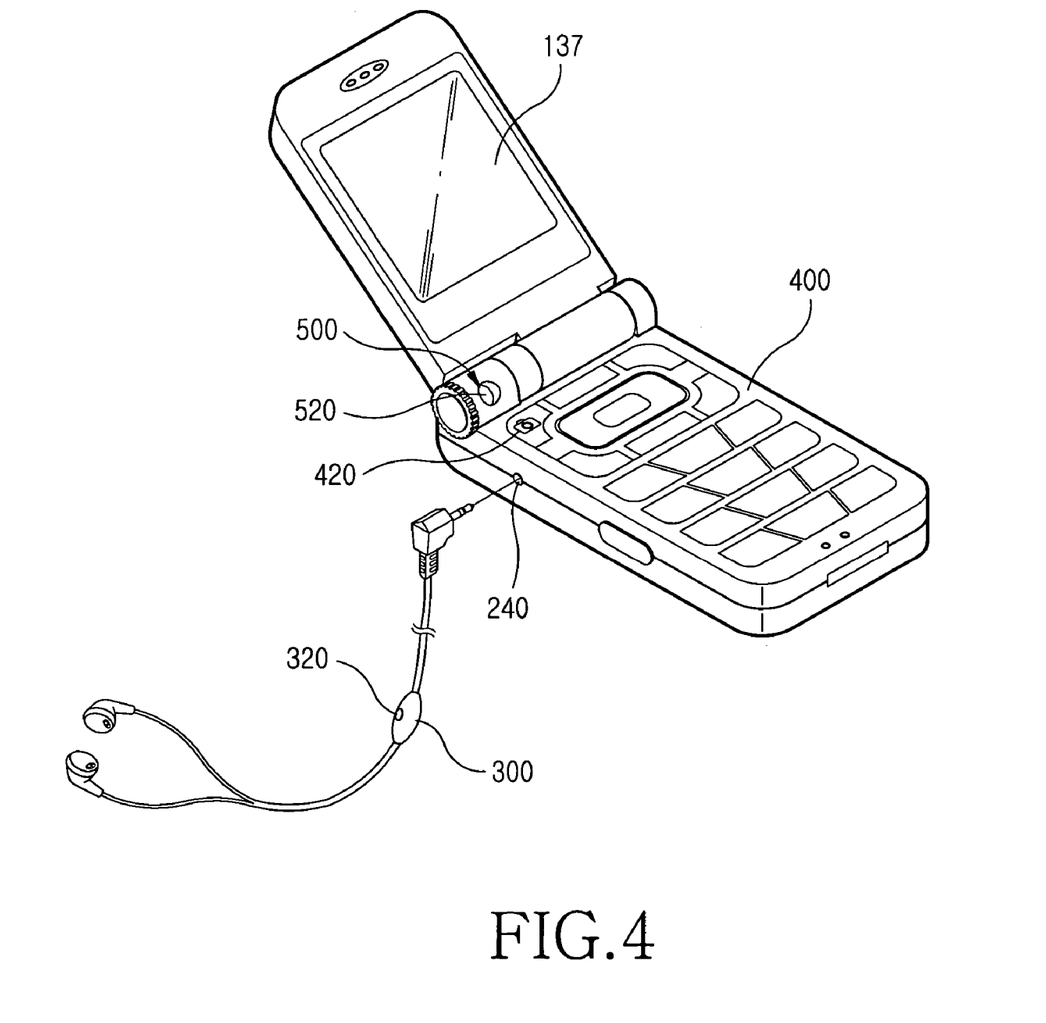
FIG. 4 shows a first embodiment of a portable terminal having the construction of FIG. 2.

FIG. 4 shows a first embodiment of a portable terminal having a construction of FIG. 2. This portable terminal is designed so that the jack interface 240 can be connected with the ear set having the handset module 300 with the call key 320. The control module 100 of the portable terminal shown in FIG. 4 determines a present operation mode when a selection signal of the call key 320 is inputted, and then performs an operation corresponding to the selection signal of the call key 320 based on the determination result. If the present operation mode is a common mode, the control module 100 performs calling with the phone number represented on a screen 137 of the LCD module 135. If the present operation mode is a camera mode, the control module 100 detects an image as photographed data, in which detection the image is inputted from a lens 520 of a lens system 500 through the camera module 130 to the image processing section 133. The control module 100 controls the LCD module 135 to display the photographed data onto the screen 137.

Figure 5:
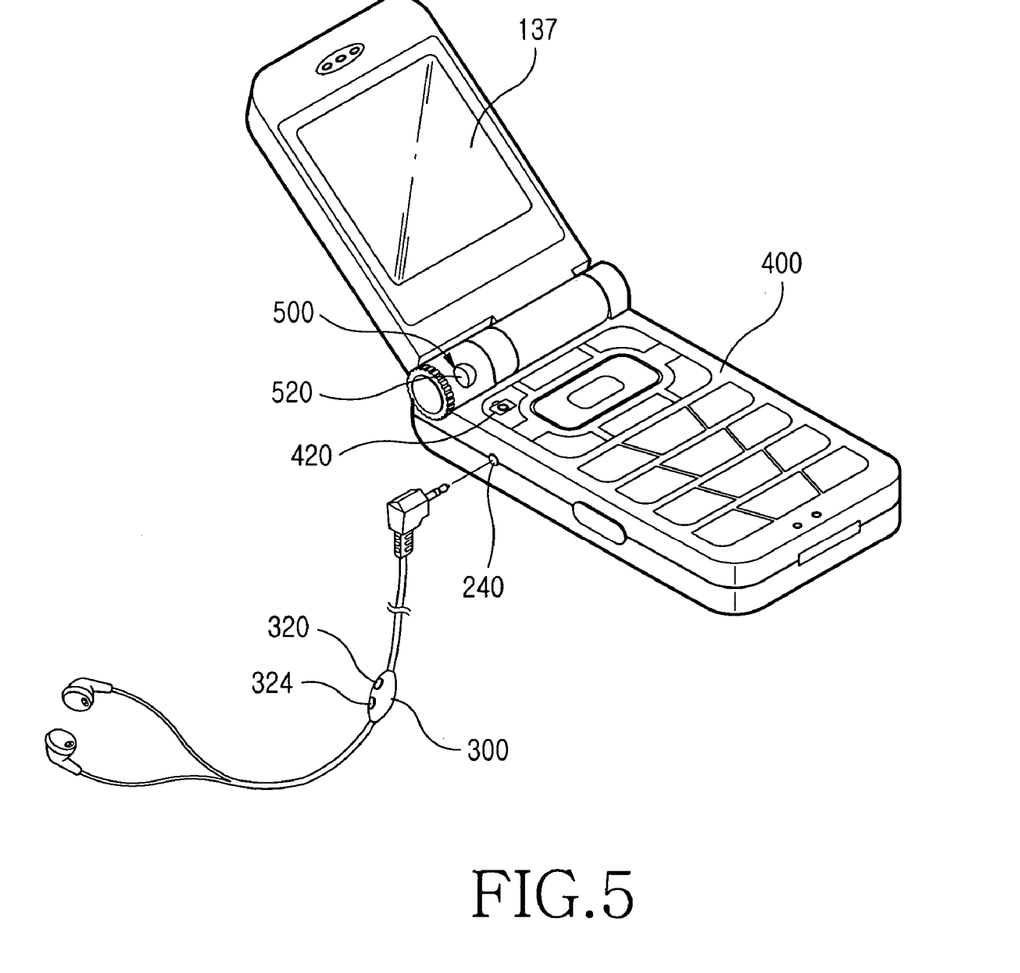
FIG. 5 shows a second embodiment of a portable terminal having the construction of FIG. 2.

FIG. 5 shows a second embodiment of a portable terminal having the construction of FIG. 2. As shown, the handset module 300 of the ear set is provided with the call key 320 and a shutter key 324, in which the shutter key performs the same function as the camera key 420 provided on the upper surface of the portable terminal. Here, signals generated by selection of the call key 320 and the shutter key 324 have different level values. For this reason the control module 100 sets each level range so as to determine which of the call key 320 and the shutter key 324 is selected. Thus, when a signal generated by selection of the call key 320 is inputted in a common mode, the control module 100 performs dialing for a call based on a signal level corresponding to selection of the call key 320. Further, when a signal generated by selection of the camera key 324 is inputted in a common mode, the control module 100 causes an operation mode of the portable terminal to be switched into a camera mode. An image inputted from a lens 520 through the camera module 130 to the image processing section 133 is displayed on the screen 137 by the LCD module 135. When a signal generated by selection of the camera key 324 once more again is inputted again, the control module 100 detects the image displayed on the screen 137 as photographed data based on the inputted signal.

The call and camera keys, with which the external ear set is separately provided, are each set to output a signal having a different level. The control module 100 causes either the call mode or the camera mode to be performed according to the level of the inputted signal. As a result, an image scanned in the camera mode can be photographed without shaking of the image.

Figure 6:
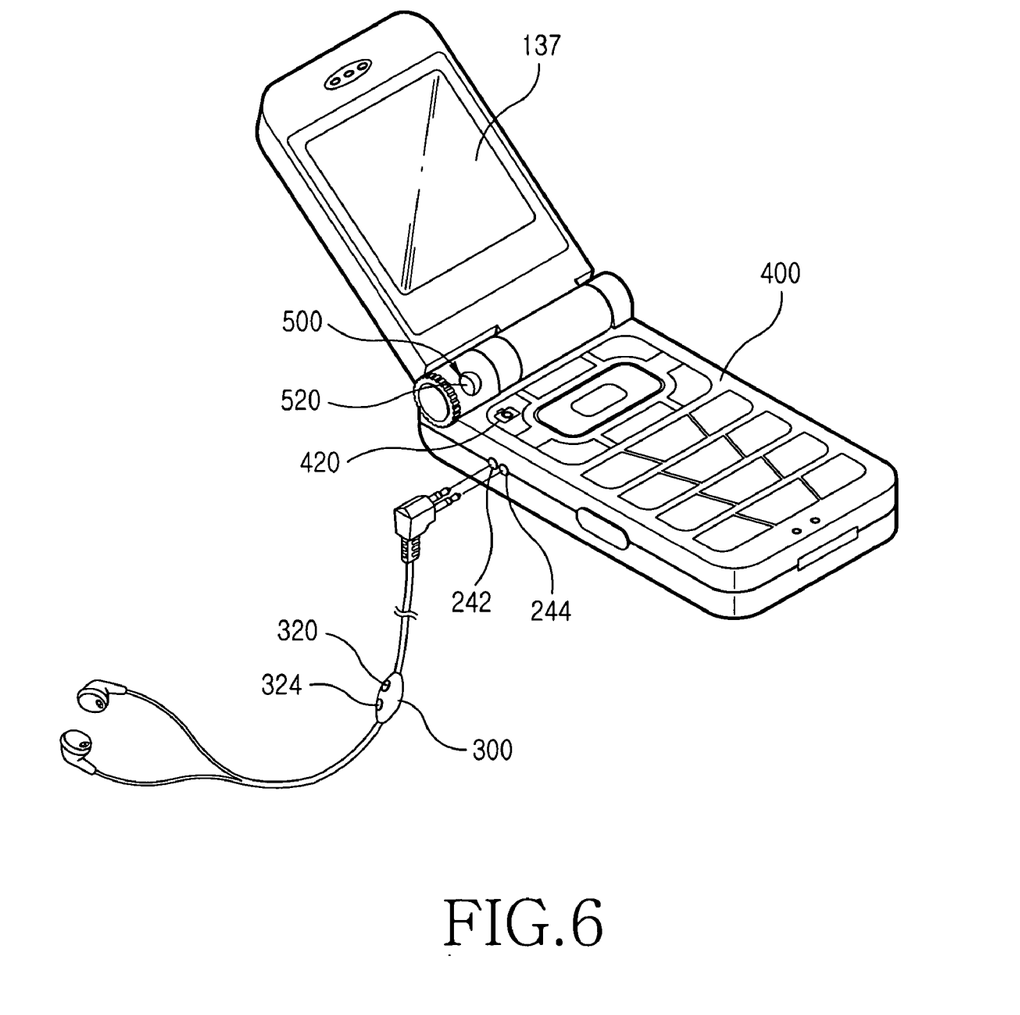
FIG. 6 shows a third embodiment of a portable terminal having the construction of FIG. 2.

FIG. 6 shows a third embodiment of a portable terminal having the construction of FIG. 2. This portable terminal has two jack interfaces 242 and 244. The handset module 300 includes the call key 320 and the camera key 324. Of two jack interfaces 242 and 244, a first jack interface 242 performs transmitting and receiving of data in cooperation with the call key 320, and a second jack interface 244 performs transmitting and receiving of data in cooperation with the camera key 324. When a signal is inputted from the first jack interface 242, the control module 100 performs dialing after switching an operation mode into an call mode. Further, when a signal is inputted from the second jack interface 244, the control module 100 switches an operation mode into a camera mode. When the camera key 324 is selected during an operation in the camera mode, and then a signal is inputted again from the second jack interface 244, the control module 100 causes a scanned image to be photographed and detects the photographed image as photographed data.

Therefore, according to this portable terminal, the operation mode is controlled by the call key 320 and the camera key 324 with which the external ear set is provided. During operation in the camera mode through selection of the camera key 324, when a signal is inputted into the second jack interface 244 by selection of the camera key 324 again, a scanned subject is detected as photographed data. As a result, shaking can be prevented while the subject is photographed. Thus, an image having a much clearer image quality can be obtained.

Figure 7:
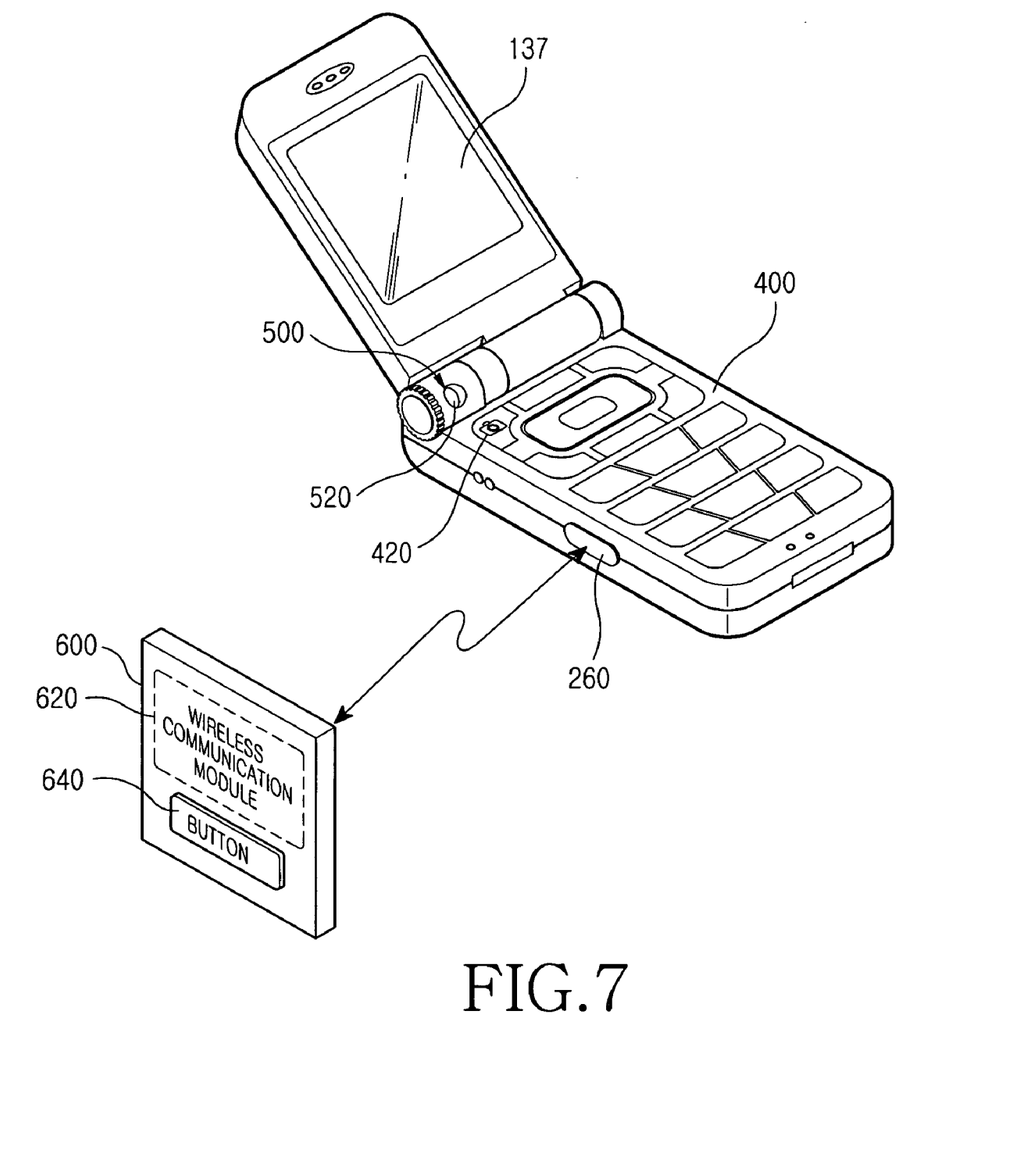
FIG. 7 shows a fourth embodiment of a portable terminal having the construction of FIG. 2.

FIG. 7 shows a fourth embodiment of a portable terminal having the construction of FIG. 2. As shown, this portable terminal is provided with a short-distance wireless communication interface 260, with which the portable terminal can wirelessly communicate with a device located at a short distance. FIG. 7 also shows a wireless remote controller 600, which is used to select a command for photographing a scanned image by performing intercommunication with the short-distance wireless communication interface 260 while the portable terminal operates in a camera mode. The remote controller 600 includes a wireless communication module 620 for performing intercommunication with the short-distance wireless communication interface 260, and a button 640 for selecting a command for photographing an scanned image.

When the camera key 420 is selected, the portable terminal operates in a camera mode. In this situation, when a photographing command is received from the wireless remote controller 600, the control module 100 detects a particular image as photographed data. The particular image is one of the scanned images which is displayed on the screen 137 in correspondence to the time when the photographing command is received. When a storing command is received with respect to the photographed data, the control module 100 stores the photographed data in the storing section 140.

Figure 8:
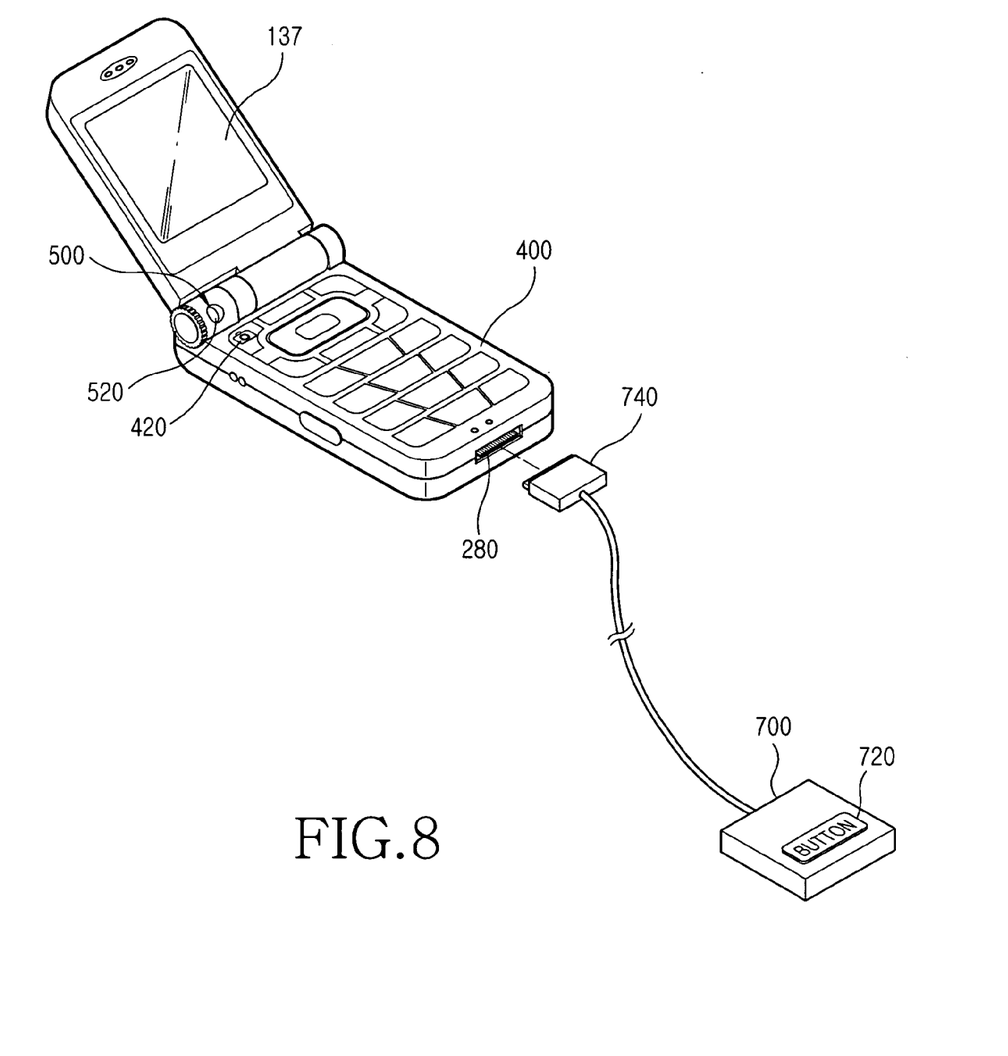
FIG. 8 shows a fifth embodiment of a portable terminal having the construction of FIG. 2.

FIG. 8 shows a fifth embodiment of a portable terminal having a construction of FIG. 2. As shown, this portable terminal is provided with a connector interface 280, which is connected with an external device by wire to perform mutual transmitting and receiving of data and is supplied with power from an external device such as a power supply. According to FIG. 8, the portable terminal includes a wire remote controller 700, which is used to control photographing of an image scanned in a camera mode. The remote controller 700 includes a button 720 for selecting a photographing command which is transmitted to the portable terminal through the connector interface 280.

Thus, in a situation in which the camera key 420 is selected and then the portable terminal operates in a camera mode, when a photographing command is received through the connector interface 280 by an operation of the button 720 of the wire remote controller 700, the control module 100 detects a particular image as photographed data, in which the particular image is one of the scanned images which is displayed on the screen 137 when the photographing command is received. When a storing command is received with respect to the photographed data, the control module 100 stores the photographed data in the storing section 140.

As mentioned above, a photographing command for an image scanned through the camera module 130 is inputted outside the portable terminal by wire or wireless, so that while the photographing command is inputted, the portable terminal can be free from shaking and thus obtain an image having a clearer image quality.

Figure 9:
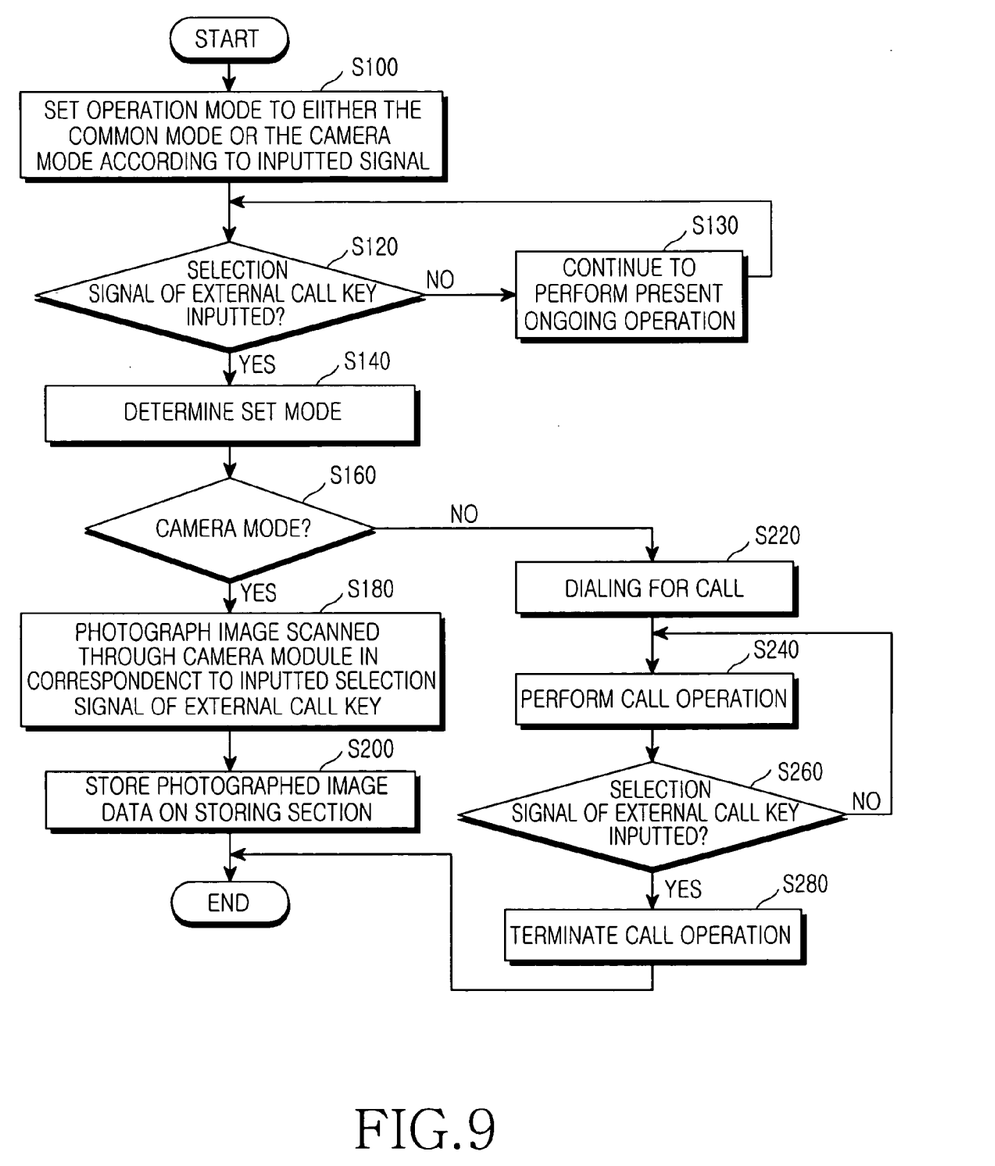
FIG. 9 is a flow chart showing a method for taking a photograph with a portable terminal in accordance with preferred embodiments of the present invention.

FIG. 9 is a flow chart showing a method for taking a photograph with a portable terminal in accordance with preferred embodiments of the present invention. First, the control module 100 sets an operation mode of the portable terminal to any one of common mode and camera mode according to an inputted signal (S100). Here, the camera mode is for getting photographed data by scanning a subject through the camera module 130, and the common mode is an operation standby mode which excludes the camera mode. The portable terminal operates based on the mode set by the control module 100.

While the portable terminal operates in the set mode, the control module 100 determines whether or not a selection signal of the external call key 320 is inputted (S120). Then, if it is determined that the selection signal of the external call key 320 is not inputted, the control module 100 causes the portable terminal to continue to perform a present ongoing operation (S130). If it is determined that the selection signal of the external call key 320 is inputted, the control module 100 determines which mode is set at present (S140).

According to a result determining the set mode, it is determined whether or not the present set mode is a camera mode (S160). If it is determined that the set mode is the camera mode, the control module 100 causes an image scanned on the camera module 130 to be photographed in correspondence to the selection signal of the external call key 320 (S180). The control module 100 causes data for the image photographed according to the inputted signal to be stored in the storing section 140 (S200).

However, if it is determined that the set mode is not the camera mode in Step 160, the control module 100 performs dialing for a call according to the selection signal of the external call key 320 (S220). Thus, the control module 100 causes a call operation to be performed (S240). While the call operation is performed, the control module 100 determines whether or not the selection signal of the external call key 320 is inputted (S260). If it is determined that the selection signal of the external call key 320 is not inputted, the control module 100 causes the operation of step 240 to be continuously performed. However, if it is determined that the selection signal of the external call key 320 is inputted, the control module 100 causes the ongoing call operation to be terminated (S280).

The photographing method mentioned above may also be employed in other embodiments of the portable terminal constructed as in FIG. 2, for example, where a photographing operation is controlled through the short-distance wireless communication interface 260 and the connector interface 280.

According to the present invention, when a command for photographing a subject scanned through the camera module is inputted through an external device, such as the handset module which is provided outside the portable terminal, and is capable of performing intercommunication with the portable terminal, the scanned subject is photographed by the inputted photographing command. Thus, while the scanned subject is photographed, the camera module can be prevented from being shaken, and thereby an image having better image quality can be obtained.

The call and camera keys with which the external ear set is separately provided are each set to output a signal having a different level. The control module 100 causes either the call mode or the camera mode to be performed according to the level of the inputted signal. As a result, while an image scanned in the camera mode is photographed, the image can be photographed without shaking.

The operation mode of the portable terminal is controlled by the call key and the camera key with which the external ear set is provided. During operation in the camera mode through selection of the camera key, when a signal is inputted into the jack interface by selection of the camera key again, a scanned subject is detected as photographed data. As a result, while the subject is photographed, shaking can be prevented. Thus, an image having clearer image quality can be obtained.

While the invention has been shown and described with reference to certain preferred embodiments thereof, it will be understood by one skilled in the art that various modifications may be made therein without departing from the spirit and scope of the invention as defined by the appended claims.

What is claimed is:

1. A portable terminal having a camera, comprising:
   a jack interface connected to an external device, the external device being capable of selecting a command for controlling at least one operation which is set in either a common mode or a camera mode;
   a control module for setting an operation mode to either the common mode or the camera mode according to an inputted signal from the external device, determining whether the camera mode has been selected, causing an image scanned through the camera to be photographed when the command is inputted from the external device during an operation in the camera mode, and switching to a communication mode when the camera mode has not been selected; and a storing module for storing the image photographed under the control of the control module.

2. A portable terminal according to claim 1, wherein the camera mode is a mode for photographing the image scanned through the camera, the common mode is an operation standby mode which excludes the camera mode and the communication mode is a mode in which a call operation is performed.

3. A portable terminal according to claim 1, wherein the external device is an ear set.

4. A portable terminal according to claim 3, wherein the ear set comprises:
   a handset module including a call key for selecting a call command in the communication mode and a photographing command in the camera mode, and a microphone for transmitting sounds to a counterpart; and
   an ear speaker outputting voice signals outputted from the jack interface.

5. A portable terminal according to claim 3, wherein the ear set comprises:
   a handset module including a call key for generating a signal having a predetermined level corresponding to a call command inputted in the communication mode, a shutter key for generating a signal having a predetermined level different from the signal of the call key corresponding to a photographing command inputted in the camera mode, and a microphone for transmitting sounds to a counterpart; and
   an ear speaker outputting voice signals outputted from the jack interface.

6. A portable terminal according to claim 5, wherein the control module causes dialing for a call to be performed when a signal level corresponding to selection of the call key is inputted, and causes the image scanned on the camera to be photographed when a signal level corresponding to selection of the shutter key is inputted.

7. A portable terminal according to claim 3, wherein the ear set comprises:
   a handset module including a call key for selecting a call command in the communication mode, a shutter key for selecting a photographing command in the camera mode, and a microphone for transmitting sounds to a counterpart; and
   an ear speaker outputting voice signals outputted from the jack interface, and
   wherein the jack interface is plural so as to input selection signals of the call and shutter keys.

8. A portable terminal according to claim 7, wherein the control module causes dialing for a call to be performed when a selection signal of the call key is inputted into a first jack interface, of the plurality of jack interfaces, for inputting the selection signal of the call key, and causes the image scanned on the camera to be photographed when a selection signal of the shutter key is inputted into a second jack interface for inputting the selection signal of the shutter key.

9. A portable terminal having a camera, comprising:
   a wireless communication interface for performing intercommunication with a wireless remote controller, the wireless remote controller being capable of selecting a photographing command in a camera mode during an operation;
   a control module for setting an operation mode to either a communication mode or a camera mode according to an inputted signal, determining whether a camera mode has been selected, causing an image scanned through the camera to be photographed when the photographing command is inputted from the wireless remote controller during an operation in the camera mode and switching to the communication mode when the camera mode has not been selected; and
   a storing module for storing the image photographed under the control of the control module.

10. A portable terminal according to claim 9, wherein the remote controller comprises:
    a wireless communication module for performing intercommunication with the wireless communication interface; and
    a button for selecting the photographing command.

11. A portable terminal having a camera comprising:
    a connector interface for performing intercommunication with a wire remote controller, the wire remote controller being capable of selecting a photographing command in a camera mode during an operation;
    a control module for setting an operation mode to either a communication mode or a camera mode according to an inputted signal, determining whether a camera mode has been selected, causing an image scanned through the camera to be photographed when the photographing command is inputted from the wire remote controller during an operation in the camera mode and switching to the communication mode when the camera mode has not been selected; and
    a storing module for storing the image photographed under the control of the control module.

12. A method for taking a photograph using a portable terminal with a camera, comprising the steps of:
    a) setting an operation mode to either a communication mode or a camera mode according to an inputted signal;
    b) when a call command is inputted externally, determining a present operation mode;
    c) if it is determined that the present operation mode is the camera mode, photographing an image scanned through the camera corresponding to the inputted call command; and
    d) if it is determined that the set operation mode is not the camera mode, switching to a communication mode.

13. A portable terminal according to claim 12, wherein the camera mode is a mode for photographing the image scanned through the camera, and the communication mode is mode in which a call operation is performed.

* * * * *